United States Patent
Iwasaki

(10) Patent No.: US 6,555,196 B2
(45) Date of Patent: Apr. 29, 2003

(54) OPTICAL DATA RECORDING MEDIUM AND MATERIAL FOR HEAT-RESISTANT PROTECTION LAYER FOR THE SAME

(75) Inventor: Hiroko Iwasaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/836,615

(22) Filed: Apr. 17, 2001

(65) Prior Publication Data

US 2001/0031333 A1 Oct. 18, 2001

Related U.S. Application Data

(62) Division of application No. 08/805,031, filed on Feb. 21, 1997, now abandoned, which is a continuation of application No. 08/612,304, filed on Mar. 7, 1996, now abandoned.

(30) Foreign Application Priority Data

Mar. 8, 1995 (JP) ................................................ 7-74714

(51) Int. Cl.⁷ ................................................ B32B 3/02
(52) U.S. Cl. .................... 428/64.1; 428/64.5; 428/64.6; 430/270.13
(58) Field of Search ................ 428/64.1, 64.4, 428/64.5, 64.6, 913; 430/270.13, 945; 369/283, 288

(56) References Cited

U.S. PATENT DOCUMENTS

| | | |
|---|---|---|
| 4,849,304 A | 7/1989 | Uchiyama et al. |
| 4,984,231 A | 1/1991 | Yasuoka et al. |
| 5,011,723 A | 4/1991 | Harigaya et al. |
| 5,024,927 A | 6/1991 | Yamada et al. |
| 5,080,947 A | 1/1992 | Yamada et al. |
| 5,100,700 A | 3/1992 | Ide et al. |
| 5,156,693 A | 10/1992 | Ide et al. |
| 5,298,305 A | 3/1994 | Shinozuka et al. |
| 5,368,986 A | 11/1994 | Terao et al. |
| 5,453,346 A | 9/1995 | Kawahasa et al. |
| 5,498,507 A | * 3/1996 | Handa ...................... 430/273.1 |
| 5,635,267 A | 6/1997 | Yamada et al. |
| 5,948,496 A | * 9/1999 | Kinoshita ................... 428/64.1 |

FOREIGN PATENT DOCUMENTS

| | | |
|---|---|---|
| DE | 4217279 | 4/1993 |
| EP | 0626682 | 11/1994 |
| JP | 6350931 | 3/1988 |
| JP | 63-281237 | 11/1988 |
| JP | 3-22229 | 1/1991 |
| JP | 3152736 | 6/1991 |
| JP | 4325938 | 11/1992 |
| JP | 5058047 | 3/1993 |
| JP | 5159362 | 6/1993 |
| JP | 5185733 | 7/1993 |
| JP | 5198003 | 8/1993 |
| JP | 5217211 | 8/1993 |

OTHER PUBLICATIONS

Abstract of Japanese Publication No. JP6274934, Patent Abstracts of Japan, vol. 18, No. 690, p. 1851.
Abstract of Japan Publication No. JP3141028, Patent Abstract of Japan, vol. 15, No. 363, p. 1251.

* cited by examiner

*Primary Examiner*—Elizabeth Mulvaney
(74) *Attorney, Agent, or Firm*—Cooper & Dunham LLP

(57) ABSTRACT

In a material for a heat-resistant protection layer and constituting one of the components of a phase variation type recording medium, at least one compound having a thermal conductivity of higher than 10 W/m·deg inclusive in a bulk state is contained. This kind of material realizes a phase variation type optical data recording medium having a high erasure ratio and allowing data to be repeatedly recorded and erased a number of times by small power even at the time of high-speed recording and erasure.

8 Claims, 1 Drawing Sheet

OPTICAL DATA RECORDING MEDIUM AND MATERIAL FOR HEAT-RESISTANT PROTECTION LAYER FOR THE SAME

This is a divisional of application Ser. No. 08/805.031 filed Feb. 21, 1997 now abandoned, which is a continuation of application Ser. No. 08/612,304 filed Mar. 7, 1996 abandoned.

BACKGROUND OF THE INVENTION

The present invention relates to an optical data recording medium for an apparatus operable with optical memories. More particularly, the present invention is concerned with a so-called phase variation type optical data recording medium in which a material constituting a recording layer varies in phase when illuminated by a light beam to thereby allow data to be recorded, reproduced, and rewritten, and a material for a heat-resistant protection layer for the production of the medium.

A recording medium of the type described belongs to a family of conventional optical memory media which selectively allow data to be recorded, reproduced or erased when illuminated by a light beam, particularly a laser beam. The phase variation type recording medium is based on the transition between the crystal phase and the non-crystal phase or between the crystal phases. This type of recording medium has, among others, an overwriting capability using a single beam; it is difficult to provide a magnetooptical memory with this kind of capability. This, coupled with the fact that the recording medium simplifies optics to be built in a drive, is accelerating the study and development of such a recording medium.

U.S. Pat. No. 3,530,441, for example, teaches a phase variation type recording medium using a so-called chalcogen alloy, e.g., Ge—Te, Ge—Te—S, Ge—Se—Sn, Ge—Te—S, Ge—Se—Sb, Ge—As—Se, In—Te or Se—As. To enhance stability and rapid crystallization, Au, Sn and Au, or Pd may be added to Ge—Te. The Au, Sn and Au, and Pd addition schemes are respectively disclosed in Japanese Patent Laid-Open Publication Nos. 61-219692, 61-270190, and 62-19490. Further, to improve the repeated recording and erasing ability, Ge—Te—Se—Sb and Ge—Te—Sb may each be provided with a particular composition ratio, as proposed in Japanese Patent Laid-Open Publication Nos. 62-73438 and 63-228433. However, none of these prior art schemes satisfies all the characteristics required of the phase variation type rewritable optical memory medium. Particularly, there is a keen demand for measures to improve the recording and erasing sensitivity, to obviate the decrease in erasure ratio ascribable to incomplete erasure at the time of overwriting, and to extend the life of recorded and non-recorded portions.

Japanese Patent Laid-Open Publication No. 63-251290 proposes a recording medium having a recording layer in the form of a single layer of substantially ternary or higher compound. In this document, the single layer of substantially ternary or higher compound refers to a layer containing a compound having a ternary or higher stoichiometric composition (e.g. $In_3SbTe_2$) by more than 90 atomic percent inclusive. The above document recites that the recording layer with such a composition improves the recording and erasing characteristic. However, this kind of implementation has a problem that the erasure ratio is low, and a problem that the laser power necessary for recording and erasing data has not been sufficiently lowered yet. Under these circumstances, an optical data recording medium having a high erasure ratio and sensitivity and a desirable repetition characteristic is called for.

In light of the above, some different materials have been developed for a protection layer feasible for a recording medium. For example, there may be used $ZnS.SiO_2$ (Japanese Patent Laid-Open Publication No. 4-74785), SiN or AlN (Japanese Patent Laid-Open Publication No. 63-259855 and Japanese Patent Publication No. 4-74785). However, even with any combination of these materials, it is impossible to satisfy all the characteristics required of the optical recording medium.

SUMMARY OF THE INVENTION

It is therefore an object of the present invention to provide a phase variation type data recording medium having a high erasure ratio and allowing data to be repeatedly recorded and erased a number of times by low power even at the time of high-speed recording and erasure, and a material for a heat-resistant protection layer for the production of the medium.

In accordance with the present invention, in a material for a heat-resistant protection layer and constituting one of a plurality of components of a phase variation type recording medium, at least one compound having a thermal conductivity of higher than 10 W/m·deg inclusive in a bulk state is contained.

Also, in accordance with the present invention, in an optical data recording medium having a substrate and a heat-resistant protection layer, a recording layer and a reflective heat radiation layer sequentially stacked on the substrate, the recording layer mainly consists of Ag, In, Sb and Te, and the heat-resistant protection layer contains at least one compound having a thermal conductivity of higher than 10 W/m·deg inclusive in a bulk state.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
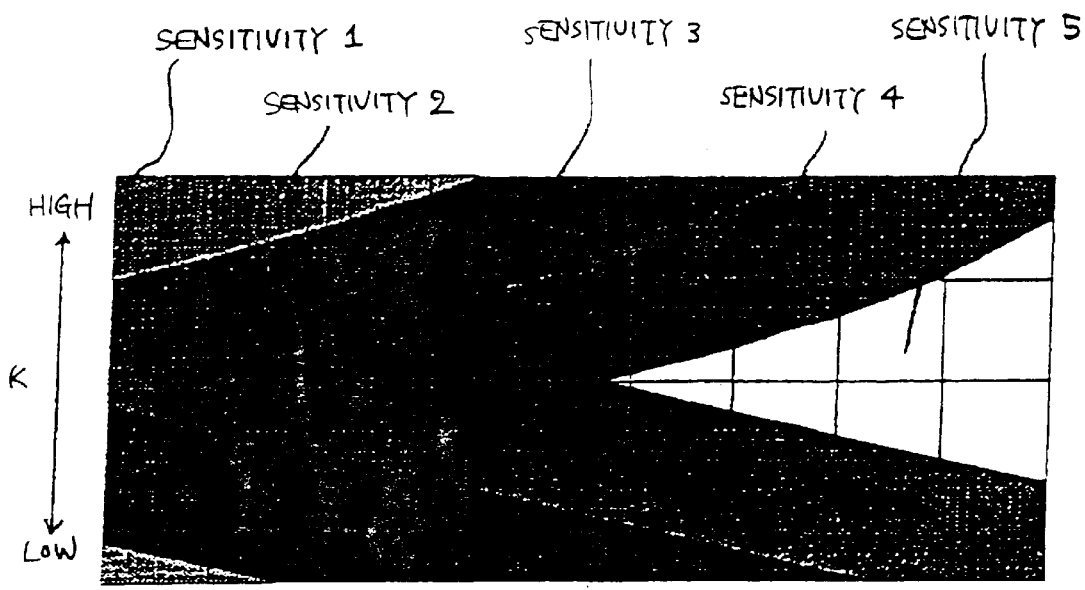
FIG. 1 shows a relation between the light-to-heat conversion efficiency a of a recording layer and the thermal conductivity κ of a protection layer.

I conducted a series of extended researches and experiments and found materials for a heat-resistant protection layer which are useful for achieving the previously stated object. The present invention is base on such materials. The materials in accordance with the present invention are characterized by the following:

(1) The materials are each used as one component of a phase variation type recording medium using the phase variation of a recording material. Each material contains at least one compound whose thermal conductivity in the bulk state is higher than 10 W/m·deg inclusive;

(2) In the above characteristic (1), the one least one compound is selected from a group consisting of aluminum oxide, titanium oxide, magnesium oxide, yttrium oxide, gallium nitride, silicon nitride, aluminum nitride, and silicon carbide; and (3) In the characteristic (1), the component is implemented by the combination of zinc oxide, aluminum oxide, titanium oxide, magnesium oxide, yttrium oxide, gallium nitride, silicon nitride, aluminum nitride and/or silicon carbide, and silicon oxide.

Also, the optical data recording medium in accordance with the present invention is characterized by the following:

(4) The medium has a substrate on which a heat-resistant protection layer, a recording layer and a reflective heat radiation layer are sequentially stacked. The recording layer is mainly constituted by Ag, In, Sb and Te while the protection layer is implemented by the component or components mentioned in any one of the above items (1) through (3).

The present invention will be described more specifically hereinafter.

With the heat-resistant protection layer whose thermal conductivity in the bulk state is higher than 10 W/m·deg inclusive, the recording medium of the present invention achieves high sensitivity and allows data to be stably recorded and erased a number of times repeatedly. This unprecedented advantage presumably stems from the following. Generally, to record data in a phase variation type optical recording medium, amorphous portions are formed in a recording layer of the medium. Amorphous portions cannot be formed unless the recording layer is heated to above its melting point and then cooled at a sufficiently high speed. On the other hand, it is necessary that the recording layer, except for its recorded portions, be protected from the influence of heat as far as possible; otherwise, the boundary between the recorded portions and non-recorded portions would be unclear, or the recorded portions would even be crystallized and erased. The temperature elevation condition for the recorded portions and that for the other portions which should be maintained at normal temperature can be effectively distinguished if excessive heat generated in the recording layer is released toward the protection layer having a high thermal conductivity, i.e., heat transfer within the layer or film is reduced. This insures temperature elevation to above the melting point and the sufficient cooling speed.

FIG. 1 shows a relation between the light-to-heat conversion efficiency a of the recording layer and the thermal conductivity κ of the protection layer. In FIG. 1, sensitivities 1 through 5 sequentially increase in the ascending order. As shown, the temperature elevation and cooling conditions of the recording layer are mainly determined by the balance between the conversion efficiency α of the recording layer and the thermal conductivity κ of the protection layer. When the thermal conductivity κ is excessively high, compared to the conversion efficiency α, the temperature rises above the melting point of the recording layer. This results in the need for great laser power which, in turn, lowers the sensitivity. At the same time, crystallization is obstructed with the result that the erasure ratio is lowered and impedes stable and repeated recording and erasure. On the other hand, if the thermal conductivity κ is excessively high, compared to the conversion efficiency α, excessive heat is accumulated in the recording layer and makes it difficult to set up the cooling speed high enough for the formation of amorphous. Consequently, more than necessary power must be applied in order to increase the apparent cooling speed, again resulting in the need for great laser power. In this case, the interfaces between the consecutive layers of the medium are more damaged by the heat, so that the stable and repeated recording and erasure is difficult to achieve. It follows that for high sensitivity, high carrier-to-noise (C/N) ratio and erasure ratio, and stable repeated recording, it is important that the protection layer be provided with a thermal conductivity matching the light-to-heat conversion efficiency of the recording layer. The protection layer in accordance with the present invention meets the above requirement.

Materials suitable for the heat-resistant protection layer have stated earlier in the items (2) and (3). Regarding the item (3), preferable contents in molar ratio are as follows:

(i) As to a material mainly consisting of silicon oxide and zinc oxide, 3% to 50% of zinc oxide;

(ii) As to a material mainly consisting of silicon oxide and aluminum oxide, 5% to 95% of aluminum oxide;

(iii) As to a material mainly consisting of silicon oxide and titanium oxide, 10% to 98% of titanium oxide;

(iv) As to a material mainly consisting of silicon oxide and magnesium oxide, 3% to 45% of magnesium oxide;

(v) As to a material mainly consisting of silicon oxide and yttrium oxide, 10% to 80% of yttrium oxide;

(vi) As to a material mainly consisting of silicon oxide and gallium nitride, 1% to 30% of gallium nitride;

(vii) As to a material mainly consisting of silicon oxide and silicon nitride, 10% to 85% of silicon nitride;

(viii) As to a material mainly consisting of silicon oxide and aluminum nitride, 1% to 50% of aluminum nitride;

(ix) As to a material mainly consisting of silicon oxide and silicon carbide, 5% to 50% of silicon carbide; and (x) As to a material mainly consisting of silicon oxide and titanium carbide, 10% to 85% of titanium carbide.

Figure 2:
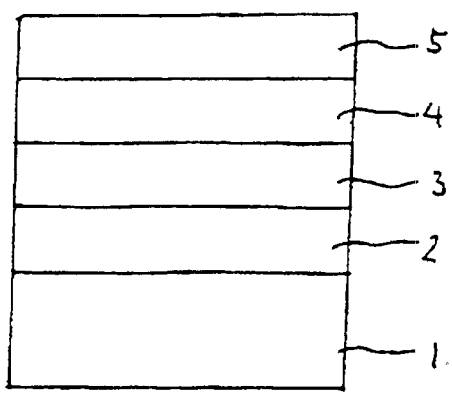
FIG. 2 shows a specific structure of an optical data recording medium in accordance with the present invention.

Referring to FIG. 2, a specific configuration of the optical data recording medium in accordance with the present invention is shown. As shown, the medium has a substrate 1 on which a lower heat-resistant protection layer 2, a recording layer 3, an upper heat-resistant protection layer 4, and a reflective heat radiation layer 5 are sequentially stacked in this order. Although the lower protection layer 2 is not essential, it should preferably be provided when the substrate 1 is made of polycarbonate resin or similar material which is not highly heat-resistant.

The protection layers 2 and 4 may be formed by any one of conventional gaseous phase growth processes including vacuum plating, sputtering, plasma CVD (Chemical Vapor Deposition), optical CVD, ion plating, and electron beam plating. The protections layers 2 and 4 should preferably be 100 Å to 5,000 Å thick each, more preferably 200 Å to 3,000 Å each. Protection layers thinner than 100 Å cannot play the expected role while protection layers thicker than 5,000 Å reduce the sensitivity and are apt to bring about separation at interfaces. The protection layers 2 and 4 may each be provided with a laminate structure, if desired.

The recording layer contains at least Ag, In, Sb and Te and may additionally contain oxygen and/or nitrogen. While the recording layer is, in many cases, amorphous in the event of film formation, it is initialized by light or heat after the fabrication of the medium. As a result, a crystal phase $AgSbTe_2$ and an amorphous phase In—Sb exist together; $AgSbTe_2$ has a crystal diameter of less than 100 Å inclusive and has a stoichiometric composition or a crystallite state close thereto. The crystal phase $AgSbTe_2$ and amorphous In—Sb are sometimes entangled in a complicated structure.

The recording layer has the above structure not only when it is fresh after initialization, but also when data stored therein are erased.

The mixed phase state described above is achievable if $AgInTe_2$ and Sb are implemented as raw materials. In the event of film formation, the recording layer presumably has an $AgInTe_2$ and Sb amorphous phase due to the chemical structures of the raw materials. This stems from the fact that when such a recording layer is heated at a temperature around the crystallization transition point (190° to 220°), AgInTe$_2$ and Sb crystal phases are produced. When the recording layer is initialized by a laser beam of adequate power, heat or the like, the crystallite AgSbTe$_2$ and amorphous phase In—Sb existing in a uniform mixture is obtained.

The recording layer may be formed by any one of conventional gaseous phase growth schemes including vacuum plating, sputtering, plasma CVD, optical CVD, ion plating, and electron beam plating. Apart from the gaseous phase growth schemes, use may be made of a sol-gel process or similar process using liquid. The recording layer should preferably be 100 Å to 10,000 Å thick, more preferably 150 Å to 3,000 Å thick. Recording layers thinner than 100 Å are extremely low in light absorption and cannot play the expected role. Recording layers thicker than 10,000 Å are difficult to cause uniform phase variation to occur at a high speed.

For the reflective heat radiation layer, use may be made of Al, Au or similar metal or an alloy thereof. Although the heat radiation layer is not essential, it is preferable because it radiates excess heat and thereby reduces the thermal load on the disk. The heat radiation layer may also be formed by any one of conventional gaseous phase growth processes including vacuum plating, sputtering, plasma CVD, optical CVD, ion plating, and electron beam plating.

While the substrate is usually formed of glass, ceramics or resin, resin is advantageous over the others in respect of moldability and cost. Typical resins are polycarbonate resin, acryl resin, epoxy resin, polystyrene resin, acrylonitrile-styrene copolymer resin, polypropylene resin, silicone-contained resin, fluorine-contained resin, ABS resin, and urethane resin. Among them, polycarbonate resin and acryl resin are preferable in respect of treatment and optical characteristic. Further, the substrate may be implemented as a disk, card or sheet, as desired.

To record, reproduce and erase data from the medium of the present invention, there may be used any desired kind of electromagnetic wave, e.g., a laser beam, electron beam, X rays, ultraviolet rays, visible rays, infrared rays, or microwave. However, a miniature and compact semiconductor laser is optimal because it can be easily mounted to a drive.

The present invention will be described in relation to specific examples although the former is not limited by the latter.

EXAMPLES 1–20 AND COMPARATIVE EXAMPLES 1–20

A substrate was implemented as a disk and formed of polycarbonate. An about 2,000 Å thick lower heat-resistant protection layer, an about 200 Å thick recording layer, an about 200 Å upper heat-resistant.protection layer and an about 1,000 Å thick reflective heat radiation layer were sequentially formed on the substrate by rf magnetron sputtering. The recording layer was formed of Ag—In—Sb—Te$_2$ while the heat radiation layer was formed of an Al alloy. The composition ratio of the recording layer was changed in conformity to the thermal conductivity of the protection layers. The protection layers each consisted of a basic material and a compound having a thermal conductivity of higher than 10 W/m·deg inclusive. Table 1 shown below lists various combinations of the basic material and compound.

TABLE 1

| | Protection Layer | | | Record Power (W) | Erasure Ratio (dB) | Repetition Stability |
|---|---|---|---|---|---|---|
| | Basic Material | Compound | x | | | |
| Comp. Ex. 1 | SiO$_2$ | Al$_2$O$_3$ | 0.04 | 18 | 42 | x |
| Ex. 1 | SiO$_2$ | Al$_2$O$_3$ | 0.37 | 14 | 35 | ○ |
| Ex. 2 | SiO$_2$ | Al$_2$O$_3$ | 0.7 | 13 | 30 | ○ |
| Comp. Ex. 2 | SiO$_2$ | Al$_2$O$_3$ | 0.97 | 22 | 22 | Δ |
| Comp. Ex. 3 | SiO$_2$ | ALN | 0.005 | 19 | 40 | x |
| Ex. 3 | SiO$_2$ | ALN | 0.05 | 15 | 35 | ○ |
| Ex. 4 | SiO$_2$ | ALN | 0.3 | 13 | 32 | ○ |
| Comp. Ex. 4 | SiO$_2$ | ALN | 0.6 | 25 | 24 | Δ |
| Comp. Ex. 5 | SiO$_2$ | GaN | 0.005 | 19 | 39 | Δ |
| Ex. 5 | SiO$_2$ | GaN | 0.03 | 14 | 32 | ○ |
| Ex. 6 | SiO$_2$ | GaN | 0.15 | 13 | 29 | ○ |
| Comp. Ex. 6 | SiO$_2$ | GaN | 0.35 | 25 | 20 | x |
| Comp. Ex. 7 | SiO$_2$ | MgO | 0.02 | 18 | 45 | x |
| Ex. 8 | SiO$_2$ | MgO | 0.36 | 12 | 36 | ○ |
| Comp. Ex. 8 | SiO$_2$ | MgO | 0.5 | 13 | 32 | ○ |
| Ex. 7 | SiO$_2$ | MgO | 0.7 | 20 | 24 | Δ |
| Comp. Ex. 9 | SiO$_2$ | Si$_3$N$_4$ | 0.08 | 18 | 41 | Δ |
| Ex. 9 | SiO$_2$ | Si$_3$N$_4$ | 0.22 | 12 | 34 | ○ |
| Ex. 10 | SiO$_2$ | Si$_3$N$_4$ | 0.47 | 13 | 29 | ○ |
| Comp. Ex. 10 | SiO$_2$ | Si$_3$N$_4$ | 0.9 | 21 | 20 | Δ |
| Comp. Ex. 11 | SiO$_2$ | SiC | 0.03 | 21 | 40 | x |
| Ex. 11 | SiO$_2$ | SiC | 0.2 | 15 | 35 | ○ |
| Ex. 12 | SiO$_2$ | SiC | 0.43 | 14 | 33 | ○ |
| Comp. Ex. 12 | SiO$_2$ | SiC | 0.55 | 23 | 22 | Δ |
| Comp. Ex. 13 | SiO$_2$ | TiC | 0.08 | 18 | 37 | x |
| Ex. 13 | SiO$_2$ | TiC | 0.16 | 13 | 30 | ○ |
| Ex. 14 | SiO$_2$ | TiC | 0.79 | 14 | 28 | ○ |
| Comp. Ex. 14 | SiO$_2$ | TiC | 0.9 | 23 | 21 | Δ |
| Comp. Ex. 15 | SiO$_2$ | TiO$_2$ | 0.08 | 17 | 35 | x |
| Ex. 15 | SiO$_2$ | TiO$_2$ | 0.35 | 14 | 30 | ○ |
| Ex. 16 | SiO$_2$ | TiO$_2$ | 0.81 | 12 | 28 | ○ |
| Comp. Ex. 16 | SiO$_2$ | TiO$_2$ | 1 | 18 | 20 | x |
| Comp. Ex. 17 | SiO$_2$ | Y$_2$O$_3$ | 0.08 | 18 | 45 | x |
| Ex. 17 | SiO$_2$ | Y$_2$O$_3$ | 0.34 | 15 | 40 | ○ |
| Ex. 18 | SiO$_2$ | Y$_2$O$_3$ | 0.73 | 15 | 38 | ○ |
| Comp. Ex. 18 | SiO$_2$ | Y$_2$O$_3$ | 0.95 | 21 | 30 | Δ |
| Comp. Ex. 19 | SiO$_2$ | ZnO | 0.02 | 16 | 38 | x |
| Ex. 19 | SiO$_2$ | ZnO | 0.18 | 12 | 33 | ○ |
| Ex. 20 | SiO$_2$ | ZnO | 0.39 | 14 | 29 | ○ |
| Comp. Ex. 20 | SiO$_2$ | ZnO | 0.6 | 18 | 23 | Δ |

In Table 1, the composition ratio x is the molar ratio occupied by the compound whose thermal conductivity is higher than 10 W/m·deg inclusive. In accordance with the present invention, all the recording layers had the amorphous layer in the event of production of the disks. The recording layers were initialized (stabilized) by sufficient crystallization caused by a semiconductor laser beam having a wavelength of 780 nm. An EFM modulated random pattern was repeatedly overwritten in each recording layer at a linear velocity of 1.2 m/s to 5.6 m/s in order to evaluate the characteristic of the medium. The above Table 1 also lists recording power, erasure ratio and repetition characteristic determined with each medium. The erasure ratios were determined in terms of the erasure ratios of a 3T signal of EFM when the 3T signal was overwritten by an 11T signal. The repetition characteristic was defined by the number of times at which the block error rate exceeds 220 cps. In Table 1, circles, triangles and crosses are respectively representative of 100 times and above, ten times and above, and less than 10 times. This is also true with Tables 2 and 3 which will be shown later. It will be seen that a desirable disk characteristic is achievable with the composition range of the present invention. In addition, high recording density is achievable with the present invention, as listed in Table 1.

COMPARATIVE EXAMPLES 21–23

Disks each having a protection layer implemented by a ZrO$_2$ and SiO$_2$ mixture were produced and evaluated in the same manner as in the previous examples and comparative examples. Table 2 shown below lists the results of evaluation.

TABLE 2

| | Protection Layer | | | Erasure | |
| | Basic Material | Compound | x | Record Power (w) | Ratio (dB) | Repetition Stability |
|---|---|---|---|---|---|---|
| Comp. Ex. 21 | SiO$_2$ | ZrO$_2$ | 0.2 | 18 | 35 | x |
| Comp. Ex. 22 | SiO$_2$ | ZrO$_2$ | 0.6 | 19 | 37 | x |
| Comp. Ex. 22 | SiO$_2$ | ZrO$_2$ | 0.8 | 20 | 38 | x |

As shown in Table 2, because the thermal conductivity of ZrO$_2$ is as low as 1.95 W/m·deg in the bulk state, the stable repetition characteristic is not achievable.

COMPARATIVE EXAMPLES 24–26

Table 3 shown below lists some different combinations of the upper and lower protection layers and the resulting disk characteristics.

TABLE 3

| | Lower Protection Layer | Thermal Conductivity of Lower Protection Layer | Upper Protection Layer | Repetition Stability |
|---|---|---|---|---|
| Comp. Ex. 24 | SiO$_2$ | 1.2 | Al$_2$O$_3$ | ○ |
| Comp. Ex. 25 | Al$_2$O$_3$ | 25 | Al$_2$O$_3$ | Δ |
| Comp. Ex. 26 | ZnO | 50 | Al$_2$O$_3$ | x |

As shown, when the lower protection layer has a higher thermal conductivity than the upper protection layer, the stable repetition characteristic is not achievable.

In summary, it will be seen that the present invention provides a phase variation type optical data recording medium having a high erasure ratio and allowing data to be repeatedly recorded and erased a number of times by small power even at the time of high-speed recording and erasure.

Various modifications will become possible for those skilled in the art after receiving the teachings of the present disclosure without departing from the scope thereof.

What is claimed is:

1. A data recording medium comprising:

a substrate;

a first protection layer having a thickness of 200 Å to 3000 Å and formed on the substrate;

a recording layer formed on the first protection layer; and a second protection layer having a thickness of 200 Å to 3000 Å and formed on the recording layer the second protection layer being an uppermost protection layer, wherein a thermal conductivity of the first protection layer is lower than a thermal conductivity of the second protection layer.

2. A data recording medium as claimed in claim 1, wherein the recording layer comprises Ag, In, Sb, and Te.

3. A data recording medium as claimed in claim 1, wherein the recording layer comprises Ag—In—Sb—Te$_2$.

4. A data recording medium as claimed in claim 1, wherein the recording layer comprises AgInSbTe and nitrogen.

5. A data recording medium as claimed in claim 1, wherein the recording layer comprises AgInSbTe and oxygen.

6. A data recording medium as claimed in claim 1, wherein the recording layer comprises AgInSbTe, oxygen, and nitrogen.

7. A data recording medium as recited in claim 1, further comprising a reflective heat radiation layer provided on the second protection layer.

8. A data recording medium, as recited in claim 1, wherein the first protection layer is silicon oxide and the second protection layer is aluminum oxide.

* * * * *